2,991,271
REACTION PRODUCTS OF A SULFUR CHLORIDE AND N,N'-DIALKYL-PHENYLENEDIAMINES AS RUBBER ANTIOZONANTS
Harry E. Albert, Akron, Ohio, assignor to The Firestone Tire & Rubber Company, Akron, Ohio, a corporation of Ohio
No Drawing. Original application Jan. 31, 1956, Ser. No. 562,576. Divided and this application Sept. 16, 1959, Ser. No. 848,884
8 Claims. (Cl. 260—45.9)

This invention relates to the use in rubber of reaction products of the sulfur chlorides and certain N,N'-dialkyl phenylenediamines.

Various phenylenediamine derivatives have previously been used in rubber. N,N'-diarylphenylenediamines have been used as flex-cracking inhibitors. N,N'-dialkylphenylenediamines have been used as antiozonants.

Of the latter, N,N'-di-sec.butyl-p-phenylenediamine is commercially available and is a powerful antiozonant. However, it is quite toxic. Also, its volatility causes losses during mixing and curing and contributes to continuing loss during the life of the vulcanized rubber article containing this material.

The sulfides of this invention are more persisent than the pheneylenediamines from which they are derived, and they have little or no toxicity. They are powerful antiozonants.

There are three different types of rubber stabilizers, viz., antiozonants, antioxidants, and flex-cracking inhibitors. These are not to be confused with one another. Each functions characteristically, and it is considered unusual if any one of these types of stabilizers performs more than the one function.

Crabtree and Kemp in an article in Industiral and Engineering Chemistry, vol. 38, starting at page 278 (1946), explain the difference in the destructiive action of oxygen and ozone on rubber. The light catalyzed oxidation which occurs during outdoor exposure forms a skin and crazed appearance over the exposed surface of the rubber. Ozone, however, even in very low concentration, induces cracking in rubber, but only if the rubber is stretched. (C. H. Leigh-Dugmore, Rubber Age and Synthetics, November and December 1952.) The cracks are perpendicular to the direction of stretch. Such cracking can occur in the absence of light. The compounds which inhibit ozone deterioration of rubber are referred to herein as antiozonants.

Tires are stressed when inflated. While a tire is at rest it is stretched statically, and on a moving vehicle it is stretched dynamically, i.e., it undergoes alternating stretching and relaxing. Some of the antiozonants are more effective in static tests and others are more effective in dynamic tests. Antiozonants which are effective under both conditions will be desired for tires, but for other rubber products an antiozonant which does not meet both tests may be used.

The inhibiting effect of the antiozonants of this invention on rubber was determined by treatment of unaged, cured stocks with air of controlled ozone content in specially designed equipment, and also by outdoor exposure to natural weathering. The tests were conducted with one-half inch dumbbell samples of approximately 100 gauge thickness. The special apparatus for testing with air of controlled ozone content, and the method of testing therein are described in the articles by Ford and Cooper, appearing in India Rubber World for September and October 1951, entitled "A Study of the Factors Affecting the Weathering of Rubber-Like Materials—I and II." The following reports refer to tests in which the ozone concentration was maintained at 60 parts per 100,000,000 under the conditions stated. Two types of tests were conducted. In one type, called the dynamic test, the sample was repeatedly stretched between the limits of 0 and 20 percent elongation at the rate of 108 cycles per minute. In the other type of tests, the static test, the samples were stretched at 12.5 percent elongation throughout the test. On completion of each test the number and size of the cracks in each sample were compared visually with the number and size of the cracks in a control strip and in the blank strip from the same masterbatch which contained no antiozone agent, both of which were cured and tested at the same time as the test sample. The number of cracks was reported on an arbitrary scale as follows: "none," "very few," "few," "moderate," "moderate-to-numerous" (or "mod-num."), and "numerous." The size of the cracks was reported according to an arbitrary scale as follows: "very slight," "slight," "moderate," "moderately severe," (or "mod. sev."), and "very severe."

In the reported tests 1.8–2.0 parts by weight of an antiozonant were added to the masterbatch formula for each 100 parts of rubber present. The results include data on the tensile properties of the cured rubber stocks before and after aging in an oven under the conditions stated. The modulus and tensile strength are given in pounds per square inch, and the elongation is reported as percent of stretch at the break. These data are included to show that the antiozonants have no substantial deleterious effect upon the cure or upon the aging of the cured stocks.

The antiozonants are effective in the vulcanizates of both natural and synthetic rubbers, as, for example, those produced by polymerizing or copolymerizing a conjugated diene, as, for example, 1,3-butadiene (or hydrocarbon homologue thereof) with a vinyl monomer as, for example, styrene, acrylonitrile, methacrylonitrile, or an ester of vinyl alcohol, an ester of acrylic or methacrylic acid, vinylpyridine, vinylcarbazole or other low-molecular-weight vinyl monomer.

The rubber can be vulcanized with sulfur or a sulfur donor, or with a cross-linking agent such as a dithiol, nitro- or nitroso-compound, quinone dioxime, etc. Known vulcanization accelerators are useful in speeding up the vulcanization process and are operative herein, especially the relatively active accelerators including the thiazole sulfenamides, e.g., N-cyclohexyl-2-benzothiazolesulfenamide, thiazoline sulfenamides, thiocarbamyl sulfenamides, mercaptothiazoles, mercaptothiazolines, thiazolyl mono- and di-sulfides, the N,N-disubstituted dithiocarbamates, the thiuram sulfides, the xanthogen sulfides, and metallic salts of mercaptothiazoles or mercaptothiazolines or dithiocarbamic acids.

One or more accelerator activators are often used with any of the accelerators mentioned, and such activators include the various derivatives of guanidine known in the rubber art, amine salts of inorganic and organic acids, various amines themselves, and alkaline salts such as sodium acetate and the like, as well as other activators known in the art. Additionally, two or more accelerators or accelerator combinations are sometimes desirable in a single rubber compound. Many of the accelerators mentioned above are suitable in latex formulations, especially such common accelerators as piperidinium pentamethylene dithiocarbamate, zinc butylxanthate, zinc ethylxanthate, zinc salt of mercaptobenzothiazole, zinc dimethyldithiocarbamate, and zinc dibutyldithiocarbamate. Although vulcanization is usually accomplished by heating a vulcanizable rubber composition at a temperature in the range of 240 to 400° F. for a time ranging from several hours to a few seconds, vulcanization does take place at lower temperatures such as ordinary room temperature. It is quite common to vulcanize a latex film containing an ultra-accelerator by allowing the film to remain at room temperature for several hours or a few days.

The antiozonants of this invention are reaction products of sulfur chloride ($S_2Cl_2$) or sulfur dichloride ($SCl_2$) and an N,N'-dialkyl-o- or p-phenylenediamine in which the alkyl groups may contain up to 12 carbon atoms. The antiozonants are, for example, obtainable from the following phenylenediamines and their equivalents.

o- AND p-PHENYLENEDIAMINES

N,N'-dimethyl-
N,N'-di-n-butyl-
N,N'-di-sec.-butyl-
N,N'-di(1-methylheptyl)
N,N'-di-sec.amyl-
N,N'-di(1-methyloctyl)
N,N'-dinonyl-
N,N'-didodecyl-
N-ethyl, N'-1-methylheptyl-
N-sec.-butyl, N'-undecyl-, etc.
N,N'-diisopropyl- The reaction products are obtained by reacting a N,N'-dialkylphenylenediamine, as defined, with a sulfur chloride, preferably in the presence of an inert solvent. The following examples are illustrative.

Example 1

Twenty-two g. (0.1 mole) of N,N'-di-sec.butyl-p-phenylenediamine was dissolved in 100 ml. n-hexane. Seven g. (0.052 mole) of $S_2Cl_2$ was weighed out and about one-third of this was added to the hexane solution. Eleven and nine-tenths grams of $K_2CO_3$ in 100 ml. of water were added to neutralize the HCl liberated in the reaction, and then the remainder of the $S_2Cl_2$ was added. The reaction product is crude bis(N,N'-di-sec.butyl-p-phenylenediamine)disulfide. A yield of 24.0 g. of a dark liquid was obtained.

Although a ratio of 0.5 mole of sulfur monochloride to 1.0 mole of N,N'-dialkyl-p-phenylenediamine was used in Example 1, higher ratios may be employed. The theoretical upper limit is $n/2$ moles of sulfur dichloride or sulfur monochloride per mole of N,N'-dialkyl-p-phenylenediamine, where $n$ is the number of reactive hydrogens (benzene nucleus or on nitrogen) in the N,N'-dialkyl-p-phenylenediamine molecule. For most purposes it probably would not be too desirable to go above a ratio of about 2 moles of sulfur chloride per mole of N,N'-dialkyl-p-phenylenediamine.

Example 2

A solution of 111 g. (0.33 mole) of N,N'-di(1-methylheptyl)-p-phenylenediamine in 500 ml. of benzene was placed in a liter 3-neck flask provided with a motor driven stirrer, a thermometer, and two addition funnels. Sulfur dichloride (17 g.=0.165 mole) was added dropwise during stirring while simultaneously a solution of 13.2 g. (0.33 mole) of sodium hydroxide in 300 ml. of water was also added. The addition required 20 minutes during which time the temperature of the reaction mixture rose from 34° to 45° C. The reaction mixture was stirred for 1 hour, then the benzene layer was separated and washed with water. The benzene was removed under reduced pressure leaving a black somewhat viscous product which weighed 95 g. Analysis showed this product to contain 3.22% sulfur.

Example 3

A solution of 111 g. (0.33 mole) of N,N'-di(1-methylheptyl)-p-phenylenediamine in 500 ml. of benzene was placed in a liter 3-neck flask provided with a motor driven stirrer, a thermometer and two addition funnels. Sulfur dichloride (34 g.=0.33 mole) was added dropwise during stirring while simultaneously a solution of 26.5 g. (0.66 mole) of sodium hydroxide in 300 ml. of water was also added. The addition required 40 minutes during which time interval the temperature of the reaction mixture rose from 23° to 52° C. The reaction mixture was stirred for 2 hours, then the benzene layer was separated and washed twice with water. The benzene was removed under reduced pressure leaving a black somewhat viscous liquid product which weighed 107 g.

Example 4

Using a procedure similar to that employed in Example 2 and Example 3, 111 g. (0.33 mole) of N,N'-di(1-methylheptyl)-p-phenylenediamine reacted with 68 g. (0.66 mole) of sulfur dichloride using 53 g. (1.32 moles) of sodium hydroxide for neutralization to give 116 g. of a black viscous liquid. This product was found to contain 12.07% sulfur.

Example 5

A solution of 55 g. (0.25 mole) of N,N'-di-sec-butyl-p-phenylenediamine in 500 ml. of benzene was placed in a 1-liter 3-neck flask provided with a motor driven stirrer, a thermometer, and two addition funnels. Sulfur dichloride (52 g.=0.5 mole) was added dropwise during stirring. Simultaneously a solution of 40 g. (1 mole) of sodium hydroxide in 300 ml. of water was added. The addition required ½ hour, during which time the temperature of the reaction mixture rose from 23° C. to 67° C. After stirring for 1 hour, the benzene layer was separated and washed with water. Removal of the solvent under reduced pressure gave a black somewhat soft solid. The sulfur content of the product was found to be 22.59%.

Example 6

Using the procedure outlined in Example 5, 55 g. (0.25 mole) of N,N'-di-sec-butyl-p-phenylenediamine reacted with 26 g. (0.25 mole) of sulfur dichloride with 20 g. (0.5 mole) of sodium hydroxide for neutralization to give 55 g. of a black, very viscous product which analysis showed to contain 12.84% sulfur.

Example 7

Using the procedure outlined in Example 5, 55 g. (0.25 mole) of N'N'-di-sec-butyl-p-phenylenediamine reacted with 13 g. (0.12 mole) of sulfur dichloride with 10 g. (0.25 mole) of sodium hydroxide for neutralization to give 54 g. of a black, somewhat viscous product. Analysis showed that this product contained 6.07% sulfur.

Although generally the ratio of the sulfur chloride to the substituted p-phenylenediamine used in the reaction will be 0.5 to 2.0 moles of the sulfur chloride to 1.0 mole of the substituted p-phenylenediamine, a larger amount of the sulfur chloride may be used to produce a higher molecular weight product. Either sulfur monochloride or sulfur dichloride, or a mixture of the two, may be used.

A tread stock masterbatch was obtained by compounding a rubbery copolymer of butadiene and styrene, according to the following formula:

COMPOUNDING FORMULA

| | Parts by weight |
|---|---|
| GR–S | 100 |
| Sulfur | 1.7 |
| Black | 45 |
| Stearic acid | 2.5 |
| Zinc oxide | 2.4 |
| Softener | 6.6 |
| Accelerator | 1.2 |
| Total | 159.4 |

The sulfide of Example 1 was tested in the masterbatch, using N,N'-di-sec.butyl-p-phenylenediamine as a control. The stocks were cured 89 minutes at 280° F. The physical properties of the stock, before and after aging 2 days in an oven at 212° F., were determined, as well as their susceptibility to ozone. The results are recorded in the following table.

|  | Blank | Test | Control |
|---|---|---|---|
| Masterbatch | 159.4 | 159.4 | 159.4 |
| Sulfide of Example 1 |  | 2 |  |
| N,N'-di-sec.butyl-p-phenylenediamine |  |  | 2 |
| Total | 159.4 | 161.4 | 161.4 |
| Physical Properties: |  |  |  |
| Normal— |  |  |  |
| 300% Modulus |  | 925 | 975 | 875 |
| Tensile Strength | 3,525 | 3,800 | 3,475 |
| Percent Elongation | 605 | 615 | 620 |
| Aged— |  |  |  |
| 300% Modulus | 2,125 | 1,975 | 1,925 |
| Tensile Strength | 2,675 | 3,100 | 3,025 |
| Percent Elongation | 350 | 410 | 405 |
| Ozone Effects (4 hrs. 60 p.p.h.m., 95° F.): |  |  |  |
| Static— |  |  |  |
| Size | Mod. sev. | None | None |
| Frequency | Mod.-num. | None | None |
| Dynamic— |  |  |  |
| Size | Slight | None | None |
| Frequency | Numerous | None | None |

The product of the example was subjected to toxicity tests, for comparison with N,N'-di-sec.butyl-p-phenylenediamine, particularly with regard to sensitization. A 5 percent solution of each in cold cream was used in the tests. Fifteen subjects were tested in each instance except where there was interference by an irritative effect. The severity of the reaction is indicated by the number of plusses, and the table shows the severity with respect to each subject tested.

SENSITIVITY EFFECT

|  | No. Subjects | Degree | Rating |
|---|---|---|---|
| Sulfide of Example 1 | 2 | ++++ | Moderately sensitizing. |
|  | 5 | +++ |  |
|  | 4 | + |  |
|  | 2 | Neg. |  |
| N,N'-di-sec.butyl-p-phenylenediamine. | 10 | ++++ | Extremely sensitizing. |
|  | 1 | +++ |  |
|  | 3 | ++ |  |
|  | 1 | + |  |

In natural weathering tests, at the end of twenty-eight days, the stock containing bis(N,N'-di-sec.butyl-p-phenylenediamine)disulfide was substantially as well preserved as the stock containing the phenylenediamine from which this test material was prepared. Both of these stocks showed no cracking and were considerably better than a stock containing no antiozonant which was badly cracked. After two months, the two stocks were equally well protected.

The products of Examples 2 to 4, inclusive, were compared to N,N'-di(1-methylheptyl)-p-phenylenediamine, the compound from which they were derived, in an Hevea rubber tread stock having the following composition:

| Rubber | 100 |
|---|---|
| HAF black | 50 |
| Zinc oxide | 3 |
| Stearic acid | 2.6 |
| Softener | 3 |
| Retarder | 1.0 |
| Accelerator | 0.5 |
| Sulfur | 2.6 |
| Antiozone agent | 1.8 |
|  | 164.5 |

The stocks were cured 40 minutes at 280° F.
After exposure of test strips for 7 hours in the weathering machine to an ozone concentration of 60 p.p.h.m. at 95° F., the rubbers containing the antiozonants of Examples 2 to 4 were equal to or slightly better than the rubber containing the parent compound, N,N'-di(1-methylheptyl)-p-phenylenediamine. With such tread stock, the advantage of a stock containing such an antiozonant over a blank stock (no antiozonant) is evident in the dynamic test results. Hence these results demonstrate the antiozonant value of the products of Examples 2 to 4.

The products of Examples 5 to 7, inclusive, were compared to di-sec-butyl-p-phenylenediamine, the compound from which they were derived, in the same Hevea tread stock as was used in testing the antiozonants of Examples 2 to 4. After exposure of test strips for 7 hours in the weathering machine to an ozone concentration of 60 p.p.h.m. at 95° F., the rubbers containing the antiozonants of Examples 5 to 7 were equal to the rubber containing the parent compound. Since the parent compound is a recognized antiozonant, the value of the products of Examples 5 to 7 as antiozonants is clearly demonstrated.

This application is a division of application Serial No. 562,576, filed January 31, 1956, now abandoned. The examples and test data are merely illustrative. The invention is defined in the claims which follow.

What I claim is:

1. Process of making a rubbery product resistant to ozone comprising vulcanizing a rubbery conjugated diene polymer admixed with a relatively small amount of a neutralized reaction product of a sulfur chloride and N,N'-dialkyl-phenylenediamine, in which each alkyl group contains 1 to 12 carbon atoms, and the position of the amine groups is selected from the class consisting of the ortho and para positions.

2. A vulcanized rubbery product produced by the process of claim 1.

3. Process of making a rubbery product resistant to ozone comprising vulcanizing a rubbery conjugated diene polymer admixed with a relatively small amount of a neutralized reaction product of 0.5 to 2 moles of a sulfur chloride and substantially one mole of N,N'-dialkyl-p-phenylenediamine, in which each alkyl group contains 1 to 12 carbon atoms.

4. A vulcanized rubbery product made in accordance with the process of claim 3.

5. Process of making a rubbery product resistant to ozone comprising vulcanizing a rubbery copolymer of butadiene and styrene admixed with a relatively small amount of a neutralized reaction product of 0.5 to 2 moles of a sulfur chloride and substantially one mole of N,N'-dialkyl-p-phenylenediamine, in which each alkyl group contains 1 to 12 carbon atoms.

6. A vulcanized rubbery product made in accordance with the process of claim 5.

7. Process of making a rubbery product resistant to ozone comprising vulcanizing a rubbery conjugated diene polymer admixed with a relatively small amount of a neutralized reaction product of 0.5 to 2 moles of a sulfur chloride and substantially one mole of N,N'-di-sec-butyl-p-phenylenediamine.

8. A vulcanized rubbery product made in accordance with the process of claim 7.

References Cited in the file of this patent

UNITED STATES PATENTS 2,187,155 Ingram _____ Jan. 16, 1940
2,867,604 Rosenwald et al. _____ Jan. 6, 1959

OTHER REFERENCES

Shaw et al.: Rubber World, vol. 130, No. 5, August 1954, pages 636–42.

UNITED STATES PATENT OFFICE
CERTIFICATE OF CORRECTION

Patent No. 2,991,271  July 4, 1961

Harry E. Albert

It is hereby certified that error appears in the above numbered patent requiring correction and that the said Letters Patent should read as corrected below.

Column 2, line 5, for "tests" read -- test --; column 4, line 73, for "89" read -- 80 --; line 74, for "stock" read -- stocks --.

Signed and sealed this 3rd day of May 1966.

(SEAL)
Attest:

ERNEST W. SWIDER
Attesting Officer

EDWARD J. BRENNER
Commissioner of Patents